United States Patent Office 3,443,379
Patented May 13, 1969

3,443,379
DUAL HYDROSTATIC TRANSMISSION SYSTEM WITH POWER-PROPORTIONING CONTROL
Charles O. Weisenbach, Watertown, N.Y., assignor to General Signal Corporation, a corporation of New York
Filed Nov. 15, 1967, Ser. No. 683,300
Int. Cl. F16h 39/02; F02b 61/00
U.S. Cl. 60—52                          5 Claims

ABSTRACT OF THE DISCLOSURE

Schemes for proportioning between two prime movers the power required to drive a common load. Each prime mover is connected with the load through a hydrostatic transmission which includes a variable displacement pump. The displacement of one pump is manually controlled, while the displacement of the other is controlled automatically and in a manner that maintains a fixed relationship between the load pressures in the two circuits. In one version, the automatic control is effective in both directions of movement of the load, and in another version this control is effective in only one direction. In the latter version, the transmission having the automatic control includes a by-pass around the pump which allows the transmission to idle at times when the automatic control is inactive.

*Background and summary of the invention*

In certain situations it is required that a single load be driven by a pair of separate prime movers, and that the driving power be divided equally, or in some fixed ratio, between the two prime movers. One specific case in which this requirement exists is the dual-engine scraper having an elevator loading mechanism. In this case, it is desired that the elevator be driven, at least in one direction, by power drawn equally from the engines on the tractor and trailing portions of the machine and, as far as I am aware, there exists no practical scheme for accomplishing this result.

The object of the present invention is to provide a drive system which can deliver power in a predetermined ratio from each of two prime movers to a common load. According to the invention, each prime mover is connected with the load through a hydrostatic transmission employing a variable displacement pump. One pump has a manually operated control, and the other is equipped with a control that automatically varies displacement as required to maintain a substantially constant ratio between the load pressures in the two transmission circuits. Since the transmission motors are interconnected through the load, and thus their speeds are the same or at least proportional, it is evident that the automatic control serves inherently to maintain a fixed ratio between the amounts of power drawn from the prime movers regardless of the speed at which each is running or the speed of movement or magnitude of the load.

In one embodiment of the invention, both transmissions are reversible, and the automatic control is effective to maintain the desired power division in both directions of operation. In another embodiment, only the manually controlled transmission is reversible. In this case, the system operates normally in one direction, but, in the reverse direction, the automatic control is rendered ineffective and the transmission with which it is associated is unloaded. This arrangement allows the load to be driven by one engine, and is acceptable in cases, such as the dual-engine scraper, where there is a great difference between the power requirements in the two directions of motion.

*Description of preferred embodiments*

Two illustrative embodiments of the invention are described herein with reference to the accompanying drawings in which.

Figure 1:
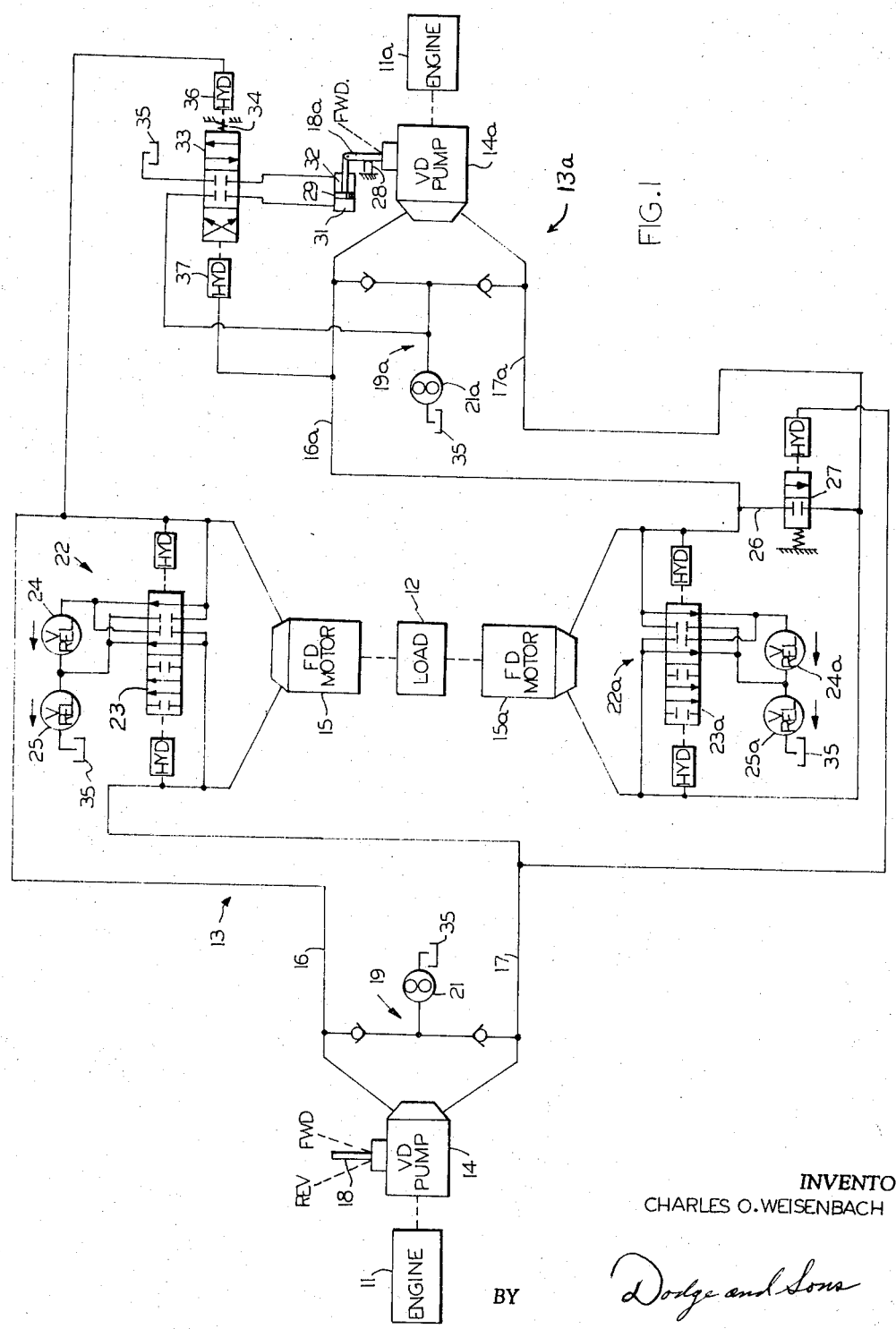
FIG. 1 is a schematic diagram of a system which controls the power division in only one direction of operation.

As shown in FIG. 1, the system is employed to deliver power equally from a pair of engines 11 and 11a to a common load 12. Engine 11 is connected with the load through a hydrostatic transmission 13 comprising a variable displacement pump 14, a fixed displacement motor 15, and a pair of conduits 16 and 17 which connect the pump and motor in a closed transmission circuit. Pump 14 is of the overcenter type and is equipped with a manually operated displacement control lever 18 which is shiftable between maximum displacement forward and reverse positions located at opposite sides of the illustrated zero displacement position. The closed transmission circuit is maintained liquid-filled by a conventional replenishing circuit 19, including a charge pump 21 which is driven by engine 11. The pressures in the two sides of the transmission circuit are limited by a relief circuit 22 comprising shuttle valve 23 and high and low pressure relief valves 24 and 25, respectively. This last mentioned circuit is the subject of U.S. Patent 2,961,829.

Engine 11a is connected with load 12 through a hydrostatic transmission 13a which is identical to transmission 13 except that it includes a by-pass conduit 26 controlled by a piloted shut-off valve 27, and the displacement control lever 18a of its pump 14a is provided with a stop 28 which prevents overcenter movement, and with an automatic positioning control. The control comprises a double-acting motor 29 having opposed working spaces 31 and 32, and a four-way valve 33 which controls flow to and from each of these spaces in accordance with the difference between the pressures in transmission conduits 16 and 16a. Valve 33 has a displacement-increasing position, toward which it is biased by a light spring 34, and in which it connects working spaces 31 and 32 with charge pump 21a and a fluid reservoir 35, respectively, and a displacement-reducing position in which it reverses these connections. Between these two positions is an intermediate lap position in which valve 33 blocks flow to and from each of the spaces 31 and 32, and thus hydraulically locks motor 29. Valve 33 is positioned by a pair of equal area actuating motors 36 and 37 which are connected, respectively, with conduits 16 and 16a; the motor 36 being arranged to shift valve 33 to the displacement-increasing position, and the motor 37 being arranged to shift the valve to the displacement-reducing position.

When the drive system is in operation and the operator shifts lever 18 to a forward position, pump 14 will deliver oil to conduit 16 and the pressure therein will immediately rise. This will cause motor 15 to commence to apply torque to load 12 and drive it in the forward direction. Simultaneously, actuating motor 36, which is subjected to the pressure in conduit 16, will shift valve 33 to its displacement-increasing position. The valve now connects working spaces 31 and 32 with pump 21a and reservoir 35, so motor 29 moves lever 18a in the displacement-increasing direction. As a result, pump 14a commences to discharge oil to conduit 16a, and motor 15a begins to deliver torque to load 12. As the displacement of pump 14a, and consequently the pressure in conduit 16a, rises, the shifting force exerted on valve 33 by motor 37 increases. When the displacement has increased sufficiently to raise the pressure in conduit 16a to a level just slightly greater than that prevailing in conduit 16, motor 37 will move valve 33 to its lap position and interrup the flow of oil to working space 31. Since the load pressures in the two transmission circuits are now substantially equal—the two differing only by a small amount attributable to the presence of spring 34—and the motors 15 and 15a inherently are consuming oil at equal rates because they are identical and are running at the same speed, it follows that the transmissions 13 and 13a will deliver equal power to load 12.

If the pressure in conduit 16 should increase, as a result, for example, of an increase in either the speed of engine 11 or the displacement of pump 14, actuating motor 36 will immediately shift valve 33 to the left from the lap position and effect a further increase in the displacement of pump 14a. The change in the output of pump 14a will raise the pressure in conduit 16a and, when the two load pressures are again equal, valve 33 will be shifted back to its lap position and re-create the hydraulic lock at motor 29. The two transmissions will now again be delivering substantially equal amounts of power to load 12.

In the event the speed of engine 11 or the displacement of pump 14 is reduced, the pressure in conduit 16 will decrease, and actuating motor 37 will immediately shift valve 33 to its displacement-reducing position. This opens a supply path from charge pump 21a to working space 32 and vents working space 31 to reservoir 35; therefore, motor 29 now pivots lever 18a in the counterclockwise direction and reduces the displacement of pump 14a. When the output of pump 14a has been reduced sufficiently to lower the pressure in conduit 16a substantially to the level then prevailing in conduit 16, motor 36 and spring 34 will return valve 33 to its lap position and again hydraulically lock motor 29. At this time, the driving power required by load 12 will again be divided equally between engines 11 and 11a. If the operator returns lever 18 to the zero displacement position, the automatic control will operate in the manner just described to move lever 18a to a very small displacement position. The output of pump 14a now is just sufficient to maintain in conduit 16a the pressure required to enable motor 37 to hold valve 33 in its lap position against the small opposing force developed by spring 34 and motor 36.

When the operator moves lever 18 to a reverse position, pump 14 will discharge oil to conduit 17, and motor 15 will drive load 12 and motor 15a in the opposite direction. Motor 15a now acts as a pump and discharges oil to conduit 16a. However, since the load pressure in conduit 17 opens shut-off valve 27 as soon as transmisison 13 begins to run in reverse, the oil discharged by motor 15a is by-passed directly back to its inlet. Therefore, transmission 13a will be idle and will impose a minimum load on engine 11, which now drives the load by itself. During this mode of operation, the pressure in conduit 16 is low, and the automatic control of pump 14a will hold lever 18a in the zero displacement position defined by stop 28. As a result, pump 14a will impose a minimum load on engine 11a.

Figure 2:
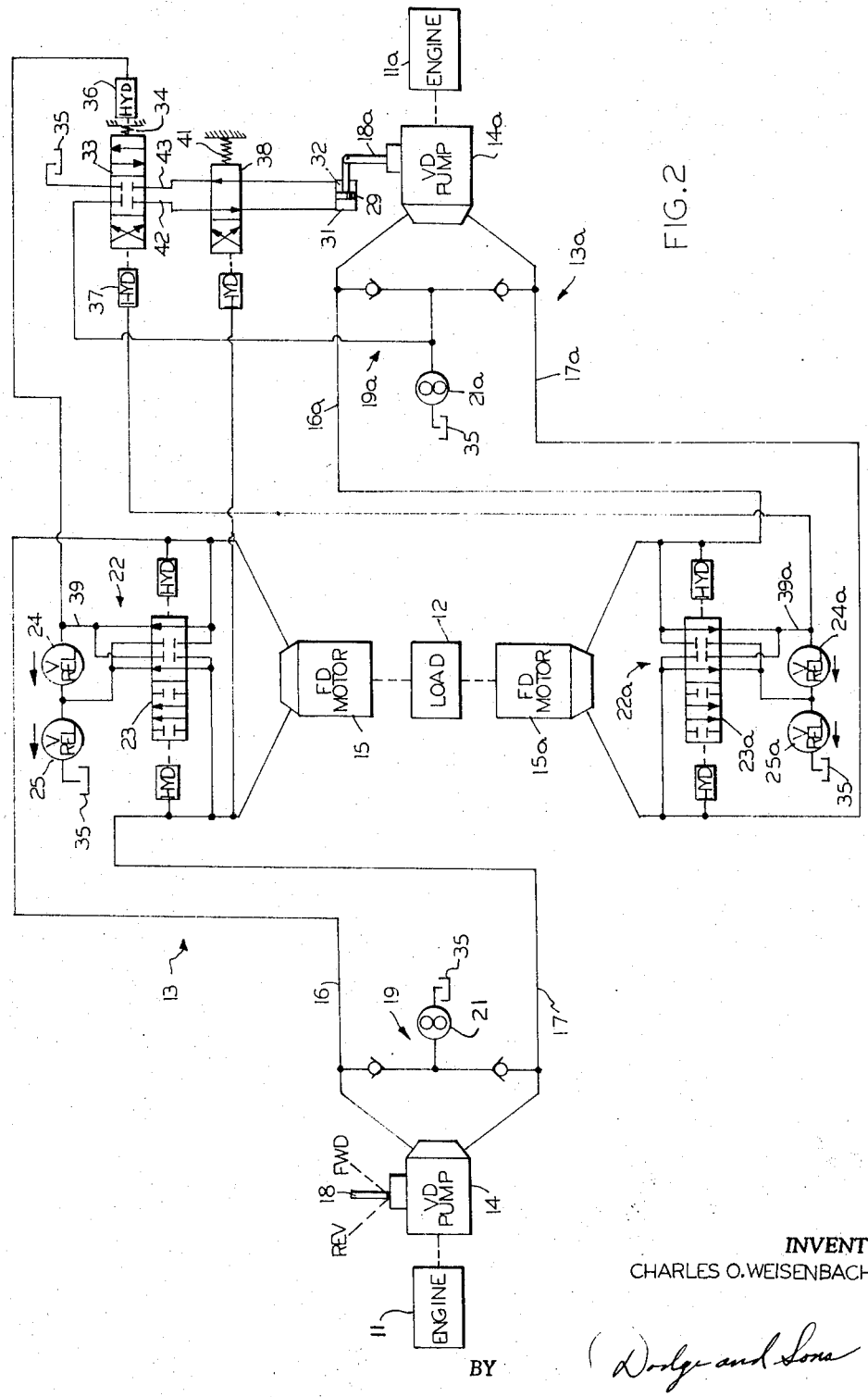
FIG. 2 is a schematic diagram of a system which controls the power division in both directions of operation.

In cases where the power output of both of the engines 11 and 11a is required to drive load 12 in each direction of operation, the system shown in FIG. 2 is used. This system differs from the one shown in FIG. 1 in four respects: first, its transmission 13a includes no by-pass conduit 26; second, the displacement control lever 18a of pump 14a can move over center to reverse the direction of flow through the pump; third, a reversing valve 38, which is piloted by the pressure in conduit 17, is interposed between control valve 33 and double-acting motor 29; and fourth, the actuating motors 36 and 37 for valve 33 are connected with the high pressure outlet passages 39 and 39a of shuttle valves 23 and 23a, respectively, rather than with conduits 16 and 16a. Reversing valve 38 is biased by a spring 41 to the illustrated forward position, in which it establishes the same connections between the service passages 42 and 43 of valve 33 and the working spaces 31 and 32 of motor 29 as those employed in FIG. 1, and the spring is sized to hold the valve in this position against the low pressure which exists in conduit 17 during forward operation.

When the FIG. 2 system is driving load 12 in the forward direction, shuttle valves 23 and 23a connect passages 39 and 39a, and consequently actuating motors 36 and 37, with conduits 16 and 16a, respectively, and reversing valve 38 assumes its illustrated position. Therefore, the system divides the driving power between engines 11 and 11a in exactly the same way as the FIG. 1 system. However, when load 12 is driven in the reverse direction, the modes of operation of the two systems are quite different. As control lever 18 in FIG. 2 is shifted to a reverse position and the pressure in conduit 17 rises, shuttle valve 23 automatically connects actuating motor 36 with conduit 17; therefore, valve 33 immediately moves to the left to its displacement-increasing position. Simultaneously, the high pressure now prevailing in conduit 17 shifts valve 38 to its reverse position. As a result, working spaces 32 and 31 are connected with charge pump 21a and reservoir 35, respectively, and motor 29 shifts lever 18a in the counterclockwise direction from the illustrated zero displacement position. This causes pump 14a to discharge oil to conduit 17a. The pressure in conduit 17a now is higher than the pressure in conduit 16a, so shuttle valve 23a shifts to the right and connects actuating motor 37 with conduit 17a. When the displacement of pump 14a has been increased sufficiently to raise the pressure in conduit 17a to approximately the level prevailing in conduit 17, motor 37 will shift valve 33 to its lap position and thereby cause it to hydraulically lock motor 29. As in the case of forward operation, the automatic control will continuously regulate the output of pump 14a as required to maintain the load pressures in the two transmissions 13 and 13a substantially equal, thus insuring that the driving power will be divided equally between the engines 11 and 11a.

Although it is assumed herein that each of the illustrated systems is designed to equalize the power demands imposed on the two engines, it should be realized that they can be designed to maintain any reasonable ratio between these demands. Ratios other than one-to-one can be provided by using drive motors 15 and 15a having unequal displacements, or using actuating motors 36 and 37 having unequal effective areas, or by both of these techniques.

I claim:

1. A system for transmitting power from two prime movers to a common load comprising
    (a) a pair of hydrostatic transmissions (13, 13a), each including a motor (15 or 15a) connected to drive the load (12), a variable displacement pump (14 or 14a) driven by one or the other of the prime movers (11, 11a), and first and second conduits (16, 17 or 16a, 17a) connecting the pump and motor in a closed circuit;
    (b) first control means (18) for varying the displacement of the pump (14) of the first transmission (13); and
    (c) second control means (18a, 21a, 28, 29, 33-37 or 18a, 21a, 23, 23a, 29, 33-38) responsive to the load pressures in the two closed circuits (16, 17 and 16a, 17a) for varying the displacement of the pump (14a) of the second transmission (13a) as required to maintain a predetermined relationship between said pressures.

2. The system defined in claim 1 in which
    (a) the first control means (18) is adapted to cause the pump (14) of the first transmission (13) to discharge selectively to either the first (16) or the second (17) conduit of the associated closed circuit;
    (b) the second control means (18a, 21a, 28, 29, 33–37) responds only to the pressures in the first conduits (16, 16a) of the two closed circuits and is adapted to cause the pump (14a) of the second transmission (13a) to discharge only to the first conduit (16a) of the associated closed circuit; and (c) the second transmission (13a) includes a by-pass conduit (26) which interconnects the first (16a) and second (17a) conduits, and a shut-off valve (27) which automatically opens and closes the by-pass conduit when the pump (14) of the first transmission discharges to the second (17) and first (16) conduits, respectively.

3. The system defined in claim 1 in which
   (a) each control means (18 and 18a, 21a, 23, 23a, 29, 33–38) is adapted to cause the associated pump (14 or 14a) to discharge selectively to either the first (16 or 16a) or second (17 or 17a) conduit of the associated closed circuit; and
   (b) the second control means responds to the pressures in the two first conduits (16, 16a) or to the pressures in the two second conduits (17, 17a) depending upon which set of conduits is at the higher pressure.

4. The system defined in claim 2 in which the second control means comprises
   (a) a displacement control element (18a) movable between zero and maximum displacement positions;
   (b) a fluid pressure control motor (29) for positioning the displacement control element;
   (c) a source (21a) of control fluid under pressure and a fluid reservoir (35);
   (d) a control valve (33) for selectively connecting the control motor with the source and the reservoir; and
   (e) opposed fluid pressure motors (36, 37) connected, respectively, with the first conduits (16, 16a) of the two closed circuits and arranged to actuate the control valve.

5. The system defined in claim 3 in which the second control means comprises
   (a) a displacement control element (18a) movable between maximum displacement positions at opposite sides of a zero displacement position to change the rate and direction of flow through the pump (14a);
   (b) a double-acting fluid pressure control motor (29) for positioning the displacement control element;
   (c) a source (21a) of control fluid under pressure and a fluid reservoir (35);
   (d) a control valve (33) including a pair of service passages (42, 43) and having a first position in which one passage (42) is connected with the source (21a) and the other passage (43) is connected with the reservoir (35), a second position in which the connections between the service passages and the source and reservoir are reversed, and an intermediate position in which the passages are isolated from each other and from the source and reservoir;
   (e) opposed fluid pressure actuating motors (36, 37) connected to shift the control valve in opposite directions from said intermediate position;
   (f) shuttle valve means (23, 23a) for connecting one actuating motor (36) with whichever of the first and second conduits (16, 17) of the first transmission (13) is at the higher pressure, and for connecting the other actuating motor (37) with whichever of the first and second conduits (16a, 17a) of the second transmission (13a) is at the higher pressure, and
   (g) a reversing valve (38) interposed between the service passages (42, 43) of the control valve (33) and the double-acting motor (29) and effective to connect the two passages with opposite sides of the motor when the pump (14) of the first transmission is discharging to the first conduit (16), and to reverse the connections between the motor (29) and the passages (42, 43) when said pump (14) is discharging to the second conduit (17).

References Cited

UNITED STATES PATENTS

| | | |
|---|---|---|
| 2,312,213 | 2/1943 | Ferris. |
| 2,400,685 | 5/1946 | Collins. |
| 2,961,829 | 11/1960 | Weisenbach _____ 60—53 |
| 3,217,821 | 11/1965 | Dumas et al. |

EDGAR W. GEOGHEGAN, *Primary Examiner.*

U.S. Cl. X.R.

60—53, 97; 91—412